United States Patent
Liebetruth

(10) Patent No.: US 7,022,923 B2
(45) Date of Patent: Apr. 4, 2006

(54) LOCKING DEVICE FOR WITHDRAWABLE CIRCUIT-BREAKERS

(75) Inventor: Marc Liebetruth, Glienicke (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/363,653

(22) PCT Filed: Aug. 21, 2001

(86) PCT No.: PCT/DE01/03176

§ 371 (c)(1),
(2), (4) Date: Aug. 8, 2003

(87) PCT Pub. No.: WO02/21652

PCT Pub. Date: Mar. 14, 2002

(65) Prior Publication Data

US 2004/0020753 A1    Feb. 5, 2004

(30) Foreign Application Priority Data

Sep. 4, 2000   (DE)   .................. 100 44 530
Jan. 24, 2001  (DE)   .................. 101 04 325

(51) Int. Cl.
    *H01H 9/00* (2006.01)
(52) U.S. Cl. .................. 200/50.21; 200/50.26
(58) Field of Classification Search ............ 200/50.21, 200/318, 50.26, 325, 50.01, 400, 50.23, 401, 200/50.02, 323, 324, 43.01–22
    See application file for complete search history.

(56) References Cited

U.S. PATENT DOCUMENTS

| 4,728,757 A | * | 3/1988 | Buxton et al. | ........... 200/50.21 |
| 6,031,192 A | * | 2/2000 | Liebetruth | ................ 200/50.21 |
| 6,479,770 B1 | * | 11/2002 | Dahl et al. | ................ 200/50.21 |

FOREIGN PATENT DOCUMENTS

| DE | 4333828 | | 8/1997 |
| DE | 19641513 | | 4/1998 |
| DE | WO 98/13915 | * | 4/1998 |
| DE | WO 99/65124 | * | 12/1999 |
| DE | 49843207 | | 3/2000 |
| EP | 0685913 | | 12/1995 |
| WO | 9956124 | | 11/1999 |

OTHER PUBLICATIONS

Liebetruth wo98/13915-translated.*

* cited by examiner

*Primary Examiner*—Lincoln Donovan
*Assistant Examiner*—M. Fishman
(74) *Attorney, Agent, or Firm*—Harness, Dickey & Pierce, P.L.C.

(57) ABSTRACT

A locking device is for low-voltage circuit-breakers. It can travel into a frame including a lock and a control member to be activated through the lock. The control member interacts with an internal locking slide when a circuit-breaker is moved into the frame, the locking slide being displaceably guided in the circuit-breaker. If the locking device is activated ("locked"), the control member acts on the internal locking slide of the circuit-breaker and ensures that the circuit breaker cannot be switched on. If circuit-breakers with locking slides that can be displaced vertically are used, the control member is situated underneath the circuit-breaker.

10 Claims, 3 Drawing Sheets

LOCKING DEVICE FOR WITHDRAWABLE CIRCUIT-BREAKERS

This application is the national phase under 35 U.S.C. § 371 of PCT International Application No. PCT/DE01/03176 which has an International filing date of Aug. 21, 2001, which designated the United States of America and which claims priority on German Patent Application numbers DE 100 44 530.6 and DE 101 04 325.2 filed Sep. 4, 2000, and Jan. 24, 2001, respectively, the entire contents of each of which are hereby incorporated herein by reference.

FIELD OF THE INVENTION

The invention generally relates to a locking apparatus for low-voltage circuit breakers. Preferably it relates to one which can be inserted into a withdrawable part rack and has an internal locking slide. The slide may be guided such that it can move linearly and connects a locking mechanism and an insertion opening for a drive crank and the like to an internal connection readiness controller, which enables connection only when all the conditions required to do so are satisfied.

BACKGROUND OF THE INVENTION

A large number of devices are known for protection against incorrect operation of circuit breakers. Conventional low-voltage circuit breakers generally have an internal locking slide, which is guided internally behind the control panel of the circuit breaker and connects locking mechanisms, insertion openings for drive cranks, pushbuttons, position signaling devices and the like to an internal connection readiness controller, which enables connection only when all the necessary conditions are satisfied. For example, WO 99/56124 A1 discloses a switching device having a locking device as well as a drive device for insertion and withdrawal relative to a withdrawable part rack, in which said devices can be operated only when the switching device is in the disconnected state. A locking slide (locking rod) is guided by use of elongated holes behind a control panel of the switching device, and has a cam element which interacts with a driver of an OFF operating device. The driver and the cam element interact such that, during operation of the locking slide, the OFF operating device is drawn inward and in the process signals to the user that the switching device is locked in the disconnected state.

A further possible way to provide protection against incorrect operation is described in DE 198 43 207 A1, which discloses a control panel for a circuit breaker, which has a user interface with an apparatus which can be retrofitted for locking, concealing and designing control elements. This retrofitting process is achieved by use of a mounting plate, which can be mounted on the control panel, for holding further functional groups, with the mounting plate having attachment apparatuses for two or more additional elements. One such additional element may be a locking mechanism (locking cylinder).

All these known devices are, however, specific to the switch and are switch-dependent, since they are components of the switch and, for example, are removed together with the switch when the switch is removed from the switchgear assembly. When inserting a different switch, it is thus no longer possible to tell what switching state or what locking conditions existed when the switch was removed. If the characteristics do not match, this can lead to danger in the assembly and to the operator.

Thus, conventionally, a circuit breaker is in general locked in the "OFF" position by pushing and locking the disconnection button. The key is withdrawn and the circuit breaker is locked in the OFF state, and cannot be connected. Nevertheless, it is possible for the circuit breaker to be moved and to be removed in the withdrawable part in the "OFF" switch position.

SUMMARY OF THE INVENTION

An object of an embodiment of the present invention is to prevent another circuit breaker from being inserted into and connected in that particular withdrawable part rack. In this case, the main switch condition should be satisfied, that is to say the position of the switching contacts match the indicated position.

According to an embodiment of the present invention, an object may be achieved for a low-voltage circuit breaker which can be inserted into a withdrawable part rack in that the locking apparatus is arranged outside the circuit breaker and has an additional locking mechanism as well as a control element which interacts with the internal locking slide. This necessarily ensures that a circuit breaker which has been inserted into the withdrawable part rack cannot be connected if the locking apparatus has previously been operated.

According to an embodiment of the invention, the locking apparatus may be designed such that if the locking slide is arranged such that it can move vertically, the control element is arranged on a fixed-position component in a switch panel, which holds the circuit breaker, underneath the circuit breaker. The desired interaction between the control element and the locking slide can in this way be achieved in an operationally reliable manner using simple means.

A compact and expedient refinement of the locking apparatus can be obtained by mounting this locking apparatus as a unit, which comprises the additional locking mechanism and the control element, in a switch panel, which holds the circuit breaker, underneath the circuit breaker. The withdrawable part rack which holds the circuit breaker, or a crossmember of the switch panel which supports the withdrawable part rack are suitable components for attachment of the unit.

However, the locking apparatus may also be subdivided into functional groups, in this way creating the capability for the additional locking mechanism to be arranged at a point on the switch panel that is particularly suitable for the user. To this end, provision is made for a control unit which has the control element to be arranged on a fixed-position component underneath the circuit breaker in the switch panel, and for a locking unit, which is connected to the control unit by means of a flexible operating element and has the additional locking element, to be mounted in the switch panel at a distance from the control unit.

In this context, it is desirable to be able to mount the control unit in the switch panel as required. This can be achieved by the control unit having a base plate with a control element which can pivot about a bearing bolt on it, and having a resetting spring which prestresses the control element into a rest position when the locking apparatus is in the unactivated state.

The locking apparatus according to an embodiment of the invention on the switchgear assembly side achieves the following function:

If any desired low-voltage circuit breaker which fits a withdrawable part rack is inserted into that empty withdrawable part rack with the locking apparatus on the switchgear assembly side operated, and is moved in the direction of the operating position, the locking apparatus on the switchgear assembly side comes into effect on leaving the test position and before reaching the operating position thereof. Thus, the control element, which is arranged in a fixed position, is located under an operating surface of the internal locking slide of the circuit breaker. The locking slide is already raised by the withdrawn crank of the insertion drive. When the operating position is reached, the crank can be inserted back into the insertion drive. However, the control slide remains in its upper limit position, that is to say the "OFF" button remains depressed, and connection is not possible, because the control slide is raised.

With the drive crank inserted and in the operating position, the additional locking mechanism can be operated, hence raising or lowering the locking slide, with the known effect. The additional locking mechanism can thus be operated when the circuit breaker is in any of the possible positions relative to the withdrawable part rack (disconnected position, test position or operating position or not fitted), but does not become effective until a circuit breaker is switched to the operating position.

BRIEF DESCRIPTION OF THE DRAWINGS

The invention will be explained in more detail in the following text with reference, in order to assist understanding, to one preferred exemplary embodiment, although this does not restrict the scope of protection.

Figure 3:
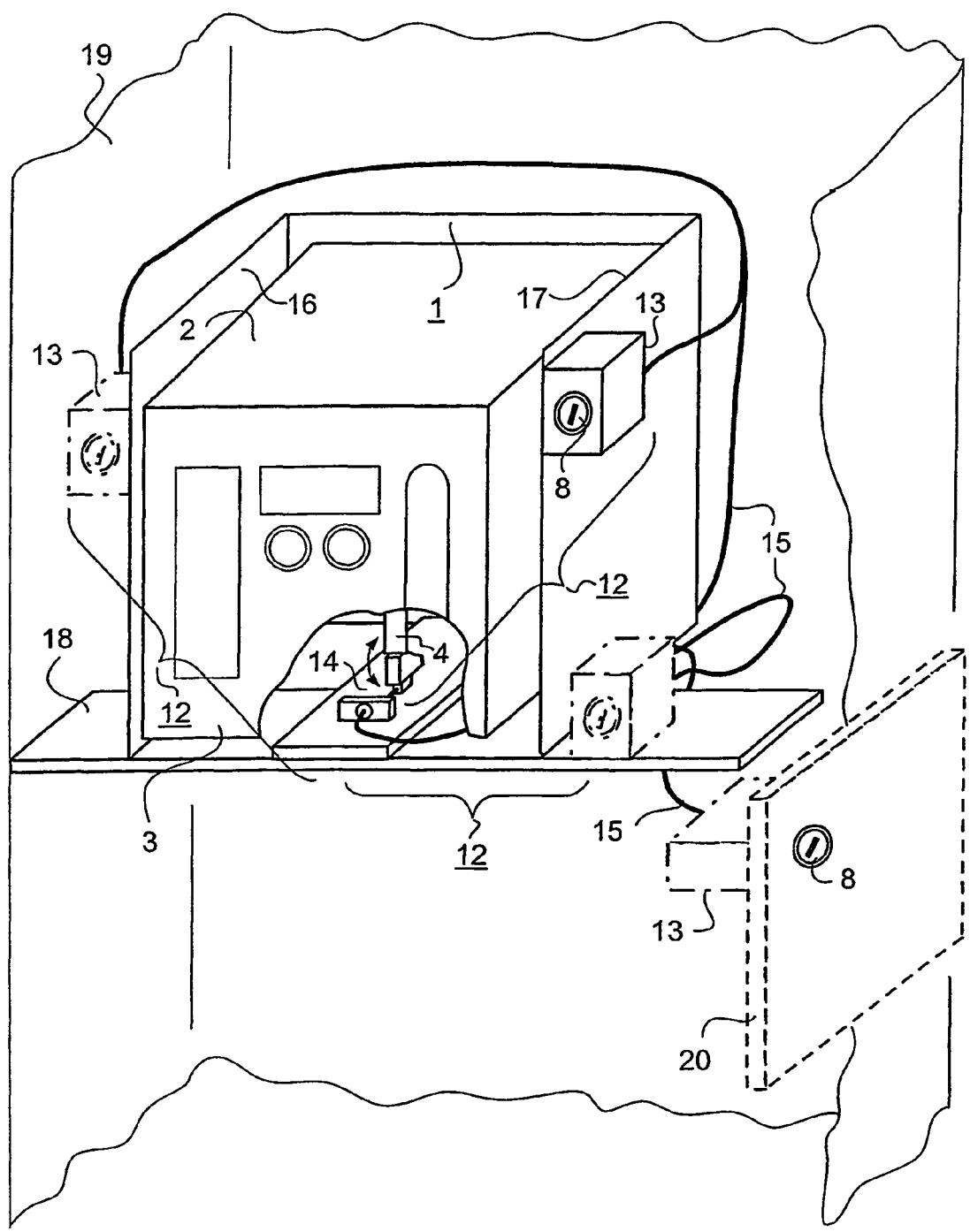
FIG. 3 shows examples of arrangements on the switchgear assembly side of a locking apparatus.
Figure 4:
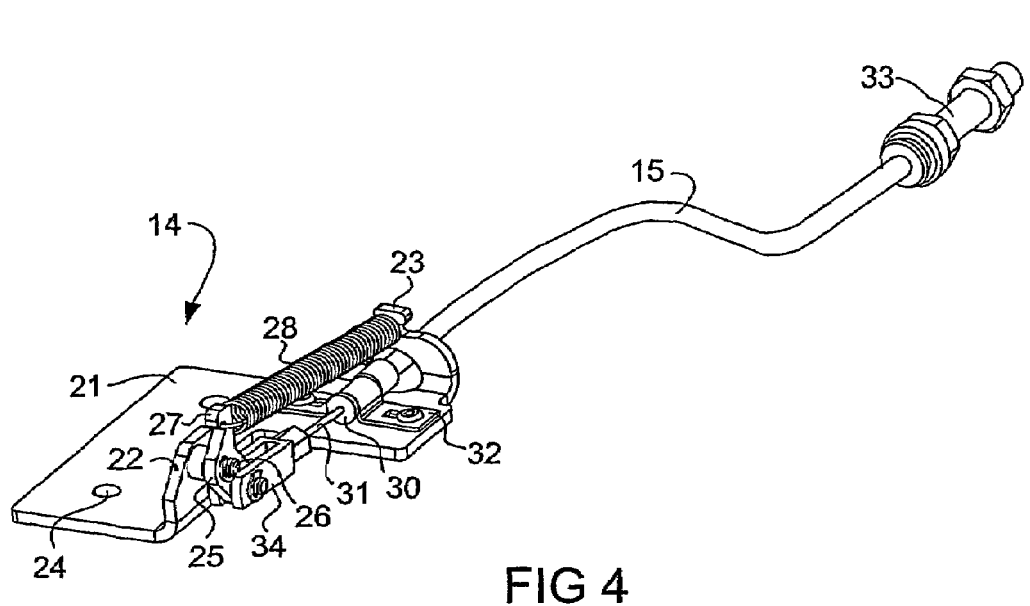
Figure 5:
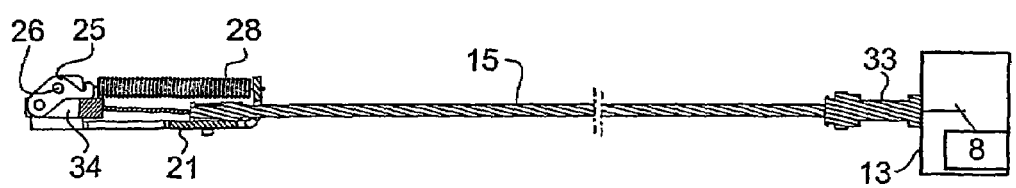
Figure 6:
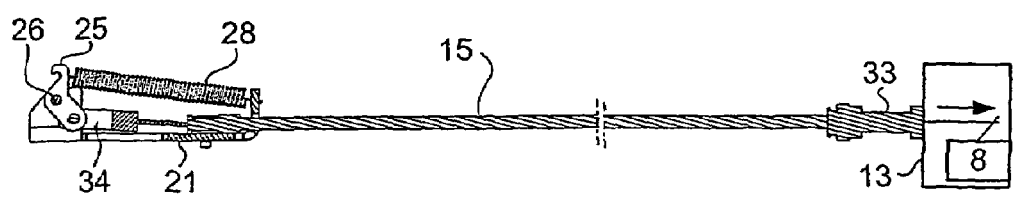

A control unit which is suitable for the arrangement shown in FIG. 3 is illustrated in an enlarged perspective form in FIG. 4, and is illustrated in the form of a sectioned side view, in both positions, in FIGS. 5 and 6.

DETAILED DESCRIPTION OF THE PREFERRED EMBODIMENTS

Figure 1:
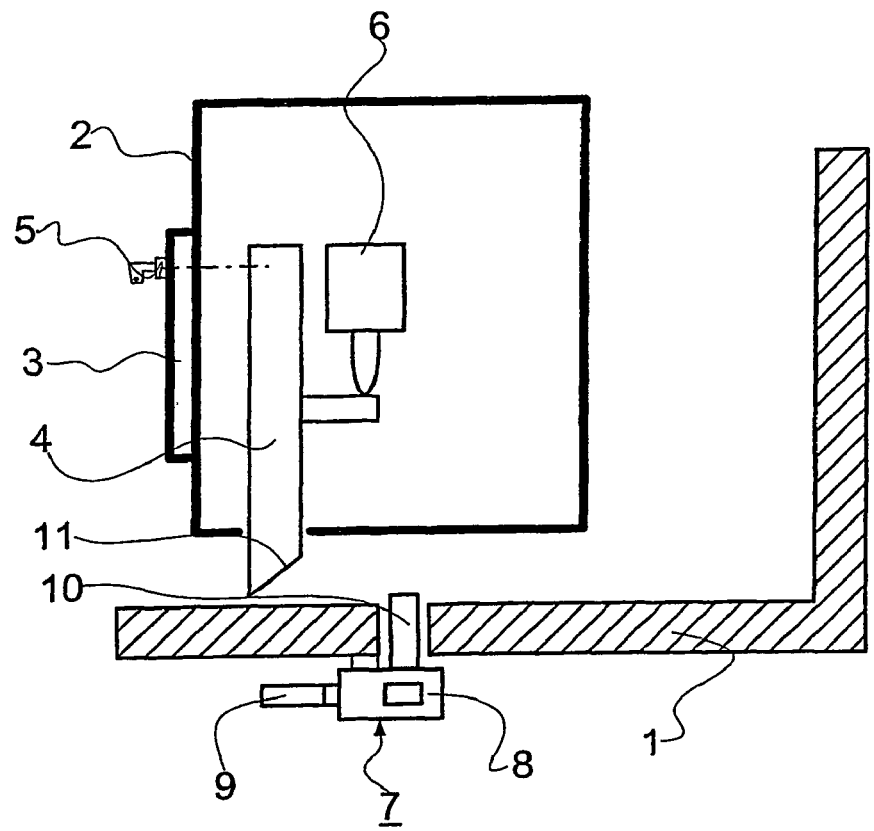
FIG. 1 shows, schematically, a low-voltage circuit breaker which has not been inserted into the withdrawable part rack, and a locking apparatus on the switchgear assembly side, which has not been operated.

FIG. 1 shows, schematically, a low-voltage circuit breaker 2 which has not been inserted into a withdrawable part frame 1 and has a control panel 3, a locking slide 4 (cf. the locking rod 23 in EP 0 685 913 B1), which is guided such that it can move linearly internally behind the control panel 3 of the circuit breaker 2 and connects a locking mechanism 5 and an insertion opening (which is not illustrated) for a drive crank and the like to an internal connection readiness controller 6, which enables connection only when all the necessary conditions are satisfied (cf. DE 43 33 828 C1), as well as an unoperated locking apparatus 7 on the switchgear assembly side, which comprises an additional locking mechanism 8, which is fitted on the switchgear assembly side underneath the low-voltage circuit breaker 2, for example on the withdrawable part rack 1, having a withdrawable key 9 and a control element 10. When the locking apparatus 7 on the switchgear assembly side is in this unoperated state, the low-voltage circuit breaker 2 can be inserted into the withdrawable part rack 1 without the locking apparatus 7 on the switchgear assembly side coming into action, because the locking slide 4 on the switch side does not come into contact with the control element 10. Switches can thus be removed and inserted in a desired manner, but only as a function of their internal control and locking conditions.

Figure 2:
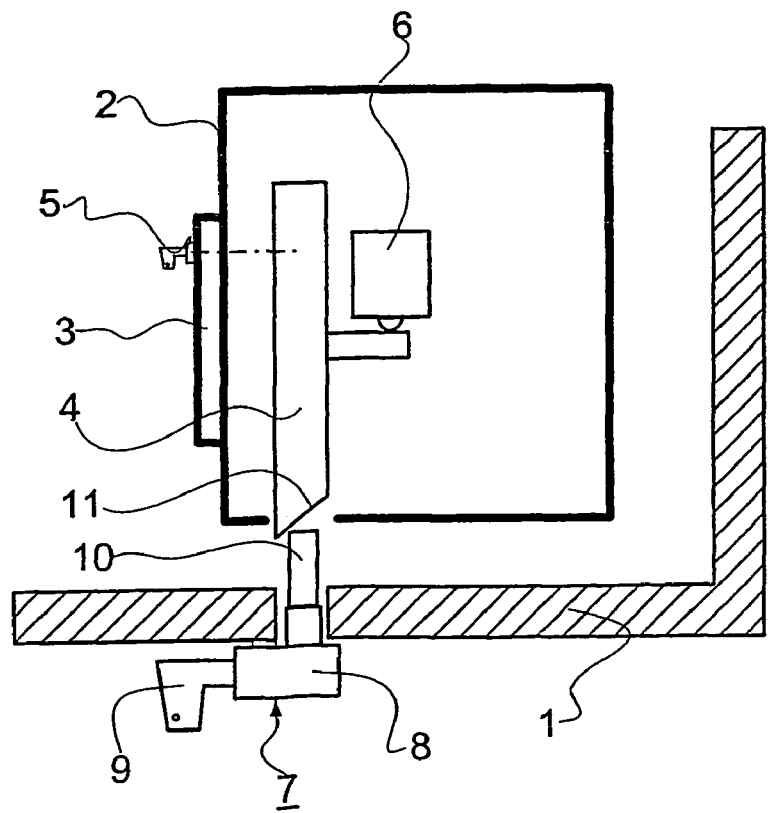
FIG. 2 shows, schematically, a low-voltage circuit breaker which has been inserted into the withdrawable part rack and is prevented from being connected by means of the locking apparatus according to an embodiment of the invention on the switchgear assembly side.

FIG. 2 shows, schematically, a low-voltage circuit breaker 2 which has been inserted into the withdrawable part rack 1 and is prevented from being connected by means of the locking apparatus 7 according to an embodiment of the invention on the switchgear assembly side. The locking apparatus 7 on the switchgear assembly side operates the control element 10 by way of the additional locking mechanism 8 during the locking process. The control element 10 projects beyond the withdrawable part rack 1, and interacts with the internal locking slide 4 of the circuit breaker 1 as follows:

If any desired circuit breaker 2 is inserted into an empty withdrawable part rack 1 with the locking apparatus 7 on the switchgear assembly side operated, and is moved in the direction of the operating position, the locking apparatus 7 on the switchgear assembly side becomes effective on leaving the test position and before reaching the operating position, that is to say the control element 10 which is located in the withdrawable part rack 1 is located under an operating surface 11 of the internal locking slide 4. The locking slide 4 has already been raised by the withdrawn crank of the insertion drive. When the operating position is reached, the crank can be pushed back into the insertion drive. However, the control slide remains in its upper limit position, that is to say the "OFF" button remains depressed and connection is impossible because the control slide is raised. This normal function of the internal locking slide 4 of the low-voltage circuit breaker 2 has not been illustrated, for the sake of clarity, since it is not significant to the invention.

FIGS. 1 and 2 show the locking apparatus 7 in the form of a unit, which is mounted underneath the circuit breaker 2 on the associated withdrawable part rack 1 or on some other fixed-position component of a switch panel which holds the withdrawable part rack together with the circuit breaker. However, applications exist in which it appears to be more advantageous or more expedient to operate the locking apparatus in some other position. This is made possible as shown in FIG. 3, which depicts another exemplary, non-limiting embodiment of the invention, by using a locking apparatus 12 which is subdivided into functional groups, with the functional groups being connected to one another by use of a hinged or flexible operating element (rod linkage, cable run, Bowden cable).

FIG. 3 shows a locking unit 13, which contains the additional locking mechanism 8, and a control unit 14 as the functional groups of the locking apparatus 12, which are connected to one another by use of a differently laid flexible operating element 15, depending on how the locking unit 13 is fitted. The operating element 15 comprises, in a known manner, a casing and a core which is guided in the casing. As is shown in FIG. 3, suitable positions for the locking unit 13 are, in particular, a left-hand or right-hand side wall 16 or 17 of the withdrawable part rack 1, a component 18 which supports the withdrawable part rack 1 and is in the form of a crossmember, an intermediate wall or a drawer base of a switch panel 19, which holds the withdrawable part rack 1, or a door 20 which closes the switch panel 19. These arrangements are only examples. Those skilled in the art may thus also choose different positions if these appear to be more expedient to them.

The control unit 14 is the same for all the illustrated and other possible arrangements of the locking unit 13. It is located on a fixed-position part, for example on the component 18 of the switch panel 19 that has been mentioned or on the withdrawable part rack 1, provided that this has a bottom plate, or the like. In order to make the control unit 14 and the component 18 visible to the necessary extent in FIG. 3, the circuit breaker 2 is shown broken-open at the bottom. A part (which interacts with the control unit 14) of the locking slide 4 which is guided such that it can move linearly behind the control panel 3 can also be seen in the broken-open area.

As can be seen in more detail in FIGS. 4, 5 and 6, the control unit 14 has a base plate 21 with a bearing block 22 and a spring block 23. Openings 24 allow the control unit 14 to be mounted in any desired manner on said parts of the switch panel 19. A control element 25 is in the form of a pivoting lever, which can move about a bearing bolt 26 which is seated in the bearing block 22. A control tab 27 on the control element 25 at the same time forms an operating surface for the interaction with the locking slide 4, and is used as an opposing bearing for a resetting spring 28, whose other end is hooked in on the spring block 23.

As already mentioned, the flexible operating element 15 comprises a casing 30 and a core, which can be moved in it, in the form of a wire cable 31. The casing 30 is mounted on the control unit 14 via a holding bracket 32, while a cap body 33 is provided at the opposite end (which interacts with the locking unit 13 in FIG. 3). The wire cable 31 is coupled to the control element 25 via a fork body 34 which acts in a hinged manner on the control element and transmits the force exerted by the wire cable 31 symmetrically to the control element 25.

FIG. 3 and the side view of the control unit 14 in FIG. 5 show the unactivated normal state of the locking apparatus 12, in which the control element 25 assumes its rest position under the influence of the resetting spring 28, which is in the form of a tension spring. The activated state is illustrated by FIGS. 4 and 6, in which the control element 25 assumes a vertical position relative to the base plate 21. In this position, the control element 25 comes under the influence of the fork body 34 and of the wire cable 31, which is operated by the locking unit 13, as is indicated in FIGS. 5 and 6.

An embodiment of the present invention ensures that a circuit breaker that has been inserted is not moved accidentally or without authorization to the operating position, where it can be connected. The previously used locking apparatuses do not provide any protection against this, since the locking apparatus is a component of the circuit breaker and can be removed only together with it.

| | List of reference symbols |
|---|---|
| 1 | Withdrawable part rack |
| 2 | Low-voltage circuit breaker |
| 3 | Control panel |
| 4 | Locking slide |
| 5 | Locking mechanism (on the circuit breaker) |
| 6 | Connection readiness controller |
| 7 | Locking apparatus (FIGS. 1 and 2) |
| 8 | Locking mechanism of the locking apparatus |
| 9 | Key |
| 10 | Control element (FIGS. 1, 2) |
| 11 | Operating surface |
| 12 | Locking apparatus (other embodiment, FIG. 3) |
| 13 | Locking unit |
| 14 | Control unit |
| 15 | Flexible operating element |
| 16 | Left-hand side wall of the withdrawable part rack 1 |
| 17 | Right-hand side wall of the withdrawable part rack 1 |

| | -continued |
|---|---|
| | List of reference symbols |
| 18 | Component of the switch panel 19 |
| 19 | Switch panel |
| 20 | Door of the switch panel 20 |
| 21 | Base plate |
| 22 | Bearing block |
| 23 | Spring block |
| 24 | Through-hole |
| 25 | Control element (pivoting lever, FIGS. 4, 5, 6) |
| 26 | Bearing bolt |
| 27 | Control tab on the control element 25 |
| 28 | Resetting spring |
| 30 | Casing of the operating element 15 |
| 31 | Wire cable |
| 32 | Holding bracket |
| 33 | Cap body |
| 34 | Fork body |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An arrangement comprising:
    plug-in unit;
    a low-voltage power switch inserted into the plug-in unit, and provided with an internal locking slide which can be moved from a resting position to an activated position, wherein the locking slide controls an internal readiness controller; and
    a locking device fixed relative to the plug-in unit and including
        a lock for locking the internal locking slide in the activated position where an activation of the low-voltage power switch is prevented; and
        a control element that cooperates with the internal locking slide;
    wherein the control element is moveable from a non-activated first position to an activated second position; and
    wherein the lock functions to lock the control element in the activated second position.

2. The arrangement as claimed in claim 1, wherein the locking slide is vertically moveable, the control element is arranged on a fixed-position component in a switch panel that holds the low-voltage power switch, and the control element is located underneath the low-voltage power switch.

3. The arrangement as claimed in claim 2, wherein the locking device is mounted as a unit, the unit comprises the lock and the control element, the unit is mounted in the switch panel, and the unit is located underneath the low voltage power switch.

4. The arrangement as claimed in claim 2, wherein a control unit, including the control element, is arranged on the fixed-position component underneath the low-voltage power switch in the switch panel, and
    wherein a locking unit, connected to the control unit via a flexible operating element and including the lock, is mounted in the switch panel, at a distance from the control unit.

5. The arrangement as claimed in claim 4, wherein the control unit comprises:
    a base plate with the control element adapted to pivot about a bearing bolt on the base plate; and a resetting spring which prestresses the control element into the non-activated position when the locking apparatus is in an unactivated state.

6. An arrangement comprising:

a plug-in unit;

a low-voltage power switch insertable into the plug-in unit and including an internal locking slide, movable from a resting position to an activated position, wherein the internal locking slide controls an internal readiness controller; and a locking device fixed relative to the plug-in unit and including a lock for locking the internal locking slide in the activated position where an activation of the low-voltage power switch is prevented; and a control element that cooperates with the internal locking slide;

wherein the control element is moveable from a non-activated first position to an activated second position; and wherein the lock functions to lock the control element in the activated second position.

7. The arrangement as claimed in claim 6, wherein the internal locking slide is vertically moveable, the control element is arranged on a fixed-position component in a switch panel that holds the low-voltage power switch, and the control element is located underneath the low-voltage power switch.

8. The arrangement as claimed in claim 7, wherein the locking apparatus is mounted as a unit, the unit comprises the lock and the control element, the unit is mounted in the switch panel, and the unit is located underneath the low-voltage power switch.

9. The arrangement as claimed in claim 7, wherein a control unit, including the control element, is arranged on the fixed-position component underneath the low-voltage power switch in the switch panel, and wherein a locking unit, connected to the control unit via a flexible operating element and including the lock, is mounted in the switch panel, at a distance from the control unit.

10. The arrangement as claimed in claim 9, wherein the control unit comprises:

a base plate with the control element adapted to pivot about a bearing bolt on the base plate; and a resetting spring which prestresses the control element into the non-activated first position when the locking apparatus is in an unactivated state.

* * * * *